(12) United States Patent
Nakatani et al.

(10) Patent No.: US 10,633,536 B2
(45) Date of Patent: Apr. 28, 2020

(54) THERMOPLASTIC RESIN COMPOSITION AND MOLDED ARTICLE THEREOF

(71) Applicant: TEIJIN LIMITED, Osaka (JP)

(72) Inventors: Yuji Nakatani, Osaka (JP); Yuichi Matsuno, Osaka (JP)

(73) Assignee: TEIJIN LIMITED, Osaka (JP)

( * ) Notice: Subject to any disclaimer, the term of this patent is extended or adjusted under 35 U.S.C. 154(b) by 85 days.

(21) Appl. No.: 16/062,136

(22) PCT Filed: Dec. 2, 2016

(86) PCT No.: PCT/JP2016/086651
§ 371 (c)(1),
(2) Date: Jun. 14, 2018

(87) PCT Pub. No.: WO2017/110514
PCT Pub. Date: Jun. 29, 2017

(65) Prior Publication Data
US 2018/0362756 A1 Dec. 20, 2018

(30) Foreign Application Priority Data

Dec. 21, 2015 (JP) ................. 2015-248526

(51) Int. Cl.
| | | |
|---|---|---|
| C08L 67/02 | (2006.01) |
| C08L 69/00 | (2006.01) |
| C08L 81/02 | (2006.01) |
| C08L 51/06 | (2006.01) |
| C08K 5/105 | (2006.01) |
| C08K 5/37 | (2006.01) |
| C08K 5/52 | (2006.01) |
| C08L 23/26 | (2006.01) |
| C08L 83/06 | (2006.01) |
| C08G 63/189 | (2006.01) |
| C08G 63/181 | (2006.01) |

(52) U.S. Cl.
CPC .............. *C08L 67/02* (2013.01); *C08K 5/105* (2013.01); *C08K 5/37* (2013.01); *C08K 5/52* (2013.01); *C08L 23/26* (2013.01); *C08L 51/06* (2013.01); *C08L 69/005* (2013.01); *C08L 81/02* (2013.01); *C08L 83/06* (2013.01); *C08G 63/181* (2013.01); *C08G 63/189* (2013.01); *C08L 2203/30* (2013.01)

(58) Field of Classification Search
CPC ....................................................... C08L 83/06
See application file for complete search history.

(56) References Cited

U.S. PATENT DOCUMENTS

| | | | |
|---|---|---|---|
| 4,996,269 A | 2/1991 | Richeson et al. | |
| 2013/0171383 A1* | 7/2013 | Gohil .................. | C08L 67/04 |
| | | | 428/35.1 |
| 2014/0073739 A1* | 3/2014 | Lin ...................... | C08L 67/02 |
| | | | 525/66 |
| 2016/0130411 A1* | 5/2016 | Alric .................... | C08L 67/02 |
| | | | 428/339 |
| 2018/0340062 A1* | 11/2018 | El-Hibri .............. | C08L 51/06 |

FOREIGN PATENT DOCUMENTS

| | | |
|---|---|---|
| EP | 0 651 009 | 5/1995 |
| JP | 63-238155 | 10/1988 |
| JP | 6-128468 | 5/1994 |
| JP | 6-145477 | 5/1994 |
| JP | 2000-212408 | 8/2000 |
| JP | 2000-219801 | 8/2000 |
| JP | 3258490 | 2/2002 |
| JP | 2008-144002 | 6/2008 |
| JP | 2008-545018 | 12/2008 |
| JP | 2011-184535 | 9/2011 |
| JP | 2011-256276 | 12/2011 |
| JP | 2012-184296 | 9/2012 |
| JP | 2013-194176 | 9/2013 |
| JP | 2016-108378 | 6/2016 |
| WO | 2006/102155 | 9/2006 |
| WO | WO 2015/006547 | * 1/2015 |

OTHER PUBLICATIONS

Translation of the International Preliminary Report on Patentability dated Jul. 5, 2018 in International Application No. PCT/JP2016/086651.
International Search Report dated Mar. 7, 2017 in International Application No. PCT/JP2016/086651 (previously submitted).
European Search Report dated Nov. 30, 2018, in corresponding European Application No. 16878406.4.

* cited by examiner

*Primary Examiner* — Marc S Zimmer
(74) *Attorney, Agent, or Firm* — Wenderoth, Lind & Ponack, L.L.P.

(57) ABSTRACT

A resin composition which comprises 100 parts by weight of a resin having a carboxyl group in at least part of the end of the molecular chain, 5 to 80 parts by weight of an ethylene-α-olefin copolymer, 1 to 30 parts by weight of an epoxy group-containing silicon elastomer and 0.01 to 3 parts by weight of at least one antioxidant selected from the group consisting of hindered phenol compound, phosphite compound, phosphonite compound and thioether compound and has low-temperature impact resistance and suppresses delamination.

16 Claims, 2 Drawing Sheets

THERMOPLASTIC RESIN COMPOSITION AND MOLDED ARTICLE THEREOF

TECHNICAL FIELD

The present invention relates to a thermoplastic resin composition which has excellent impact resistance at a low temperature and suppresses the delamination of a stretch-blow molded container.

BACKGROUND ART

There is a recent trend of shifting the materials of fire extinguisher and LPG containers which have been made only from metals to resins due to deregulation in Japan. As compared with metal containers, resin containers have advantages that they are lightweight and easy to carry, rarely erode and have excellent designability.

Oxygen, nitrogen and CNG cylinders which require high pressure resistance as containers need such physical properties that they hardly embrittle at a low temperature since the reduction of temperature occurs due to the sudden release of internal pressure when a gas in the cylinders is discharged and used. Further, when a gas is stored in a container in a liquid state, such physical properties that the container hardly embrittles at a lower temperature range are required. Therefore, the modification of the physical properties of a thermoplastic resin which more easily embrittles at a low temperature range than metals is essential in order to use the thermoplastic resin in pressure-resistant containers and liquid gas storage containers. Aromatic polyesters typified by polyethylene terephthalate and polyethylene naphthalate have high strength, transparency, chemical resistance, heat resistance and gas barrier property at the time of stretching and therefore are used in various containers. However, since the aromatic polyesters embrittle at a low temperature range, it is difficult to use them in the above pressure-resistant containers and liquid gas storage containers.

JP-A 63-238155 discloses a composition comprising polyethylene naphthalate and a polyester elastomer. However, the glass transition temperature of the polyester elastomer is about −40° C. and has a problem that it cannot achieve sufficiently high impact resistance at a temperature range below −40° C. JP-A 2008-545018 discloses a composition comprising a thermoplastic resin and an ethylene-α-olefin copolymer. The ethylene-α-olefin copolymer has a glass transition temperature of −60° C. or lower and has an advantage that it has excellent impact resistance at a low temperature range. However, the ethylene-α-olefin copolymer has low compatibility with a thermoplastic resin having a carboxyl group at part of the end, typified by a polyester and therefore, the composition comprising the ethylene-α-olefin copolymer and the thermoplastic resin has such problems that it cannot achieve sufficiently high impact resistance and causes delamination when it is stretch-blow molded. JP-A 2011-256276 teaches that an ethylene-propylene-butadiene copolymer component and an ethylene glycidyl methacrylate copolymer component may be used in combination with a resin component containing an aromatic polyester. Since the ethylene glycidyl methacrylate copolymer serves as a compatibilizing agent, it is effective in preventing delamination at the time of stretch-blow molding but deteriorates low-temperature impact resistance since it has a methacrylate unit as a hard component.

DISCLOSURE OF THE INVENTION

It is an object of the present invention to provide a thermoplastic resin composition which has excellent impact resistance at a low temperature and suppresses the delamination of a stretch-blow molded container.

Other objects and advantages of the present invention will become apparent from the following description.

The inventors of the present invention conducted intensive studies to attain the above object and found that a resin composition which has excellent low-temperature impact resistance and suppresses the delamination of a stretch-blow molded container is obtained by adding an ethylene-α-olefin copolymer, an epoxy group-containing silicon elastomer having a low glass transition temperature and an antioxidant to a thermoplastic resin component containing a carboxyl group in at least part of the end of the molecular chain. Thus, the inventors attained the above object.

That is, according to the present invention, the above object and advantage of the present invention are attained by a resin composition comprising (A) 100 parts by weight of a resin component having a carboxyl group in at least part of the end of the molecular chain, (B) 5 to 80 parts by weight of an ethylene-α-olefin copolymer, (C) 1 to 30 parts by weight of an epoxy group-containing silicon elastomer and (D) 0.01 to 3 parts by weight of at least one antioxidant selected from the group consisting of hindered phenol compound, phosphite compound, phosphonite compound and thioether compound.

PRATICAL EMBODIMENT OF THE INVENTION

Figure 1:
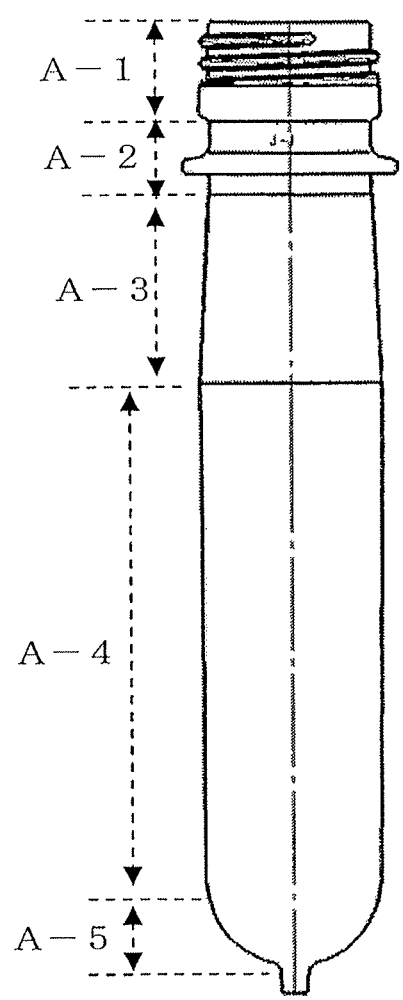
FIG. 1 is a side view of a preform produced in Example 1 of the present invention.

The method of preparing a resin and a molding method used in the present invention will be described hereinbelow.

<Resin Component>

In the present invention, a resin containing a carboxyl group in at least part of the end of the molecular chain (component A) is contained. The end of the molecular chain is the end part of the main chain of a polymer. Specific examples of the resin include aromatic polyesters such as polyethylene terephthalate, polybutylene terephthalate, polyethylene naphthalate, polybutylene naphthalate and polypropylene terephthalate; wholly aromatic liquid crystal polyesters; aliphatic polyesters such as polylactic acid, polybutylene succinate, polyethylene succinate and polyglycolic acid; polyester carbonates; and polyphenylene sulfites having a carboxylate terminal. Out of these, aromatic polyesters are preferred as they have good balance among chemical resistance, heat resistance, strength and gas barrier property.

As for a dicarboxylic acid component and a diol component forming a polyester, an aromatic polyester resin comprising an aromatic dicarboxylic acid component in an amount of preferably not less than 70 mol %, more preferably not less than 90 mol %, most preferably not less than 99 mol % of the total of all dicarboxylic acid components is preferred as aromatic polyesters.

Examples of the dicarboxylic acid include terephthalic acid, isophthalic acid, 2-chloroterephthalic acid, 2,5-dichloroterephthalic acid, 2-methylterephthalic acid, 4,4'-stilbenedicarboxylic acid, 4,4'-biphenyldicarboxylic acid, orthophthalic acid, 2,6-naphthalenedicarboxylic acid, 2,7-naphthalenedicarboxylic acid, bisbenzoic acid, bis(p-carboxyphenyl)methane, anthracenedicarboxylic acid, 4,4'-diphenyl ether dicarboxylic acid, 4,4'-diphenoxyethane dicarboxylic acid, 5-Na sulfoisophthalic acid and ethylene-bis p-benzoic acid. These dicarboxylic acids may be used alone or in combination of two or more. The aromatic polyester may contain less than 30 mol % of an aliphatic dicarboxylic acid component besides the above aromatic dicarboxylic acid component. Examples of the aromatic dicarboxylic acid include adipic acid, sebacic acid, azelaic acid, dodecanedioic acid, 1,3-cyclohexanedicarboxylic acid and 1,4-cyclohexanedicarboxylic acid.

Examples of the diol as the diol component of the aromatic polyester include ethylene glycol, diethylene glycol, 1,2-propylene glycol, 1,3-propanediol, 2,2-dimethyl-1,3-propanediol, trans- or cis-2,2,4,4-tetramethyl-1,3-cyclobutanediol, 1,4-butanediol, neopentyl glycol, 1,5-pentanediol, 1,6-hexanediol, 1,4-cyclohexanedimethanol, 1,3-cyclohexanedimethanol, decamethylene glycol, cyclohexanediol, p-xylenediol, bisphenol A, tetrabromobisphenol A and tetrabromobisphenol A-bis(2-hydroxyethyl ether). They may be used alone or in combination of two or more. The amount of the dihydric phenol in the diol component is preferably not more than 30 mol %.

Out of the above aromatic polyesters, polyethylene terephthalate and polyethylene naphthalate all of which are excellent in stretch-blow moldability are preferred, and polyethylene naphthalate which is excellent in chemical resistance, heat resistance, strength and gas barrier property is particularly preferred.

As the polyethylene naphthalate, polyethylene naphthalate containing 80 to 100 mol % of a naphthalenedicarboxylic acid component and 0 to 20 mol % of at least one selected from a terephthalic acid component and an isophthalic acid component as dicarboxylic acid components and an ethylene glycol component as the diol component is preferred. As for the more preferred copolymerization ratio of the dicarboxylic acid components, the amount of the naphthalene dicarboxylic acid component is 85 to 100 mol % and the amount of each of the terephthalic acid component and the isophthalic acid component is 0 to 15 mol %. When the amount of the terephthalic acid component and/or the isophthalic acid component as a dicarboxylic acid component(s) exceeds 20 mol %, crystallinity lowers, the thickness of a barrel part becomes small at the time of blow molding, and the gas barrier property deteriorates suddenly.

The intrinsic viscosity (IV) of polyethylene naphthalate is preferably 0.5 to 1.0 dl/g, more preferably 0.55 to 0.90 dl/g, much more preferably 0.6 to 0.85 dl/g. When the intrinsic viscosity is higher than 1.0 dl/g, an appearance defect such as the whitening of a gate part (bottom part of the container) may occur due to an increase in resin pressure applied at the time of injection molding. When the intrinsic viscosity is lower than 0.5 dl/g, the crystallinity of polyethylene naphthalate becomes high and crystallization occurs when a thick preform is molded, whereby the preform may be broken. The intrinsic viscosity was obtained from viscosity data on the obtained solution by measuring the viscosity of a resin solution prepared by heating and melting 0.6 g of a resin in 50 ml of a mixed solvent of phenol and tetrachloroethane (weight ratio of 3/2) and cooling it to room temperature with an Ostwald viscosity tube at 35° C.

As for the method of producing an aromatic polyester resin, the dicarboxylic acid or dicarboxylic acid ester and the above diol component are polymerized by heating in the presence of a polycondensation catalyst containing titanium, germanium or antimony, and the by-produced water or lower alcohol is discharged to the outside of the system in accordance with a commonly used method. Examples of the germanium-based polymerization catalyst include germanium oxides, hydroxides, halides, alcolates and phenolates. More specific examples thereof include germanium oxide, germanium hydroxide, germanium tetrachloride and tetramethoxy germanium. In the present invention, a manganese, zinc, calcium or magnesium compound which is used in a transesterification reaction as the pre-stage of conventionally known polycondensation may be used in combination, and the catalyst may be deactivated with a phosphoric acid or phosphorous acid compound after the end of the transesterification reaction for polycondensation. Further, the method of producing an aromatic polyester resin may be carried out in batch or continuous polymerization system out of which continuous polymerization system is preferred. This is because the aromatic polyester resin produced by this system has high quality stability and is advantageous in terms of cost.

<Ethylene-α-olefin Copolymer>

In the present invention, the ethylene-α-olefin copolymer (component B) is contained as a soft component. The ethylene-α-olefin copolymer is a copolymer obtained by copolymerizing ethylene with an α-olefin having 3 or more carbon atoms. The α-olefin having 3 or more carbon atoms is preferably an α-olefin having 3 to 20 carbon atoms, as exemplified by propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene and 12-ethyl-1-tetradecene. They may be used alone or in combination of two or more. The above copolymer may further contain a nonconjugated diene.

Examples of the nonconjugated diene include 1,4-pentadiene, 1,4-hexadiene, 1,5-hexadiene, 1,4-octadiene, 1,5-octadiene, 1,6-octadiene, 1,7-octadiene, 2-methyl-1,5-hexadiene, 6-methyl-1,5-heptadiene, 7-methyl-1,6-octadiene, 4-ethylidene-8-methyl-1,7-nonadiene, 4,8-dimethyl-1,4,8-decatriene (DMDT), dicyclopentadiene, cyclohexadiene, cyclooctadiene, 5-vinyl norbornene, 5-ethylidenen-2-norbornene, 5-methylene-2-norbornene, 5-isopropylidene-2-norbornene, 6-chloromethyl-5-isopropenyl-2-norbornene, 2,3-diisopropylidene-5-norbornene, 2-ethylidene-3-isopropylidene-5-norbornene and 2-propenyl-2,5-norbornadiene. They may be used alone or in combination of two or more.

The nonconjugated diene is preferably copolymerized in an amount of not more than 14 wt % based on the total weight of ethylene and the α-olefin. In the present invention, the ethylene-α-olefin copolymer is preferably modified by an unsaturated carboxylic acid. When it is modified by an unsaturated carboxylic acid or an acid derivative thereof, its compatibility with the resin as the component A and low-temperature impact resistance improve and the delamination of a container obtained by stretch-blow molding is suppressed. Examples of the unsaturated carboxylic acid include maleic acid, fumaric acid, tetrahydrophthalic acid, itaconic acid, citraconic acid, crotonic acid, isocrotonic acid, nadic acid, acrylic acid and methacrylic acid. Examples of the acid derivatives of the unsaturated carboxylic acid include acid anhydrides, imides, amides and esters of the above unsaturated carboxylic acids. Examples of the derivative include maleimide, maleic anhydride, citraconic anhydride, monomethyl maleate and glycidyl maleate. Out of these, unsaturated carboxylic acids and acid anhydrides thereof are preferred, and maleic acid, nadic acid and acid anhydrides thereof are particularly preferred. The modification amount of the unsaturated carboxylic acid is preferably 0.5 to 4 mol %, more preferably 1 to 3 mol % based on 100 mol % of the ethylene-α-olefin copolymer. When the modification amount of the unsaturated carboxylic acid is smaller than 0.5 mol %, the effect of improving compatibility with the resin as the component A may not be fully obtained and when the amount is larger than 4 mol %, an excessive reaction with the epoxy group-containing silicon elastomer (component C) occurs, whereby an appearance defect may be produced by gelation.

To obtain a modified product by reacting the unsaturated carboxylic acid or acid derivative thereof with the ethylene-α-olefin copolymer efficiently, a reaction is preferably carried out in the presence of a radical initiator. The reaction is generally carried out at 60 to 350° C. The amount of the radical initiator is preferably 0.001 to 2 parts by weight based on 100 parts by weight of the ethylene-α-olefin copolymer. Preferred examples of the radical initiator include organic peroxides such as dicumyl peroxide, di-tert-butyl peroxide,
2, 5-dimethyl-2,5-di(tert-butylperoxy)hexyne-3,
2,5-dimethyl-2,5-di(tert-butylperoxy)hexane and
1,4-bis(tert-butylperoxyisopropyl)benzene.

The content of the component B in the present invention is 5 to 80 parts by weight, preferably 7 to 65 parts by weight, more preferably 10 to 60 parts by weight based on 100 parts by weight of the component A. When the content of the component B is lower than 5 parts by weight, the effect of improving low-temperature impact resistance is not fully obtained and when the content is higher than 80 parts by weight, the container is broken due to uneven thickness at the time of stretch-blow molding.

<Epoxy Group-containing Silicon Elastomer>

The resin composition of the present invention comprises an epoxy group-containing silicon elastomer (component C).

When the silicon elastomer having a low glass transition temperature contains an epoxy group, it can improve compatibility between the component A and the component B, whereby the low-temperature impact resistance of the obtained resin composition is improved and the delamination of a stretch-blow molded container is suppressed.

Examples of the silicon elastomer as the component C include silicon elastomers obtained by 3-dimensionally crosslinking a linear organopolysiloxane (refer to JP-A 63-77942, JP-A 3-93834 and JP-A 04-198324), powdered silicon elastomers (U.S. Pat. No. 3,843,601, JP-A 62-270660 and JP-A 59-96122) and silicon composite elastomers obtained by covering the surfaces of the silicon elastomers obtained by the above methods with a silicon resin which is a polyorganosilsesquioxane cured product having a 3-D ramified crosslinked structure represented by (R'SiO$_{3/2}$)n (R' is a substituted or nonsubstituted monovalent hydrocarbon group) (refer to JP-A 7-196815). The component C is obtained by modifying these elastomers with an epoxy group.

The average particle diameter of the component C of the present invention is preferably 0.01 to 50 μm, more preferably 0.05 to 30 μm. When the average particle diameter is smaller than 0.01 μm, satisfactory low-temperature impact resistance may not be obtained and when the average particle diameter is larger than 50 μm, fine irregularities appear on the surface of a container at the time of stretch-blow molding, thereby impairing the appearance. The average particle diameter can be measured by a laser light diffraction scattering method.

The epoxy group-containing silicon elastomer is commercially available from Toray Dow Corning Silicone under the trade name of Trefil EP-2601.

The content of the component C of the present invention is 1 to 30 parts by weight, preferably 3 to 20 parts by weight, more preferably 5 to 15 parts by weight based on 100 parts by weight of the component A. When the content of the component C is lower than 1 part by weight, it does not fully function as a compatibilizing agent, that is, the effect of improving normal-temperature (23° C.) and low-temperature impact resistance and the effect of suppressing the delamination of a container obtained by stretch-blow molding are not fully obtained. When the content is higher than 30 parts by weight, an appearance defect is produced by the surface roughness of a container obtained by stretch-blow molding.

<Antioxidant>

As the antioxidant (component D) in the present invention, at least one antioxidant selected from the group consisting of hindered phenol compound, phosphite compound, phosphonite compound and thioether compound is used. Surprisingly, low-temperature impact resistance is improved by blending the antioxidant into the composition though the reason for this is unknown.

Examples of the hindered phenol compound include α-tocopherol, butyl hydroxytoluene, cinapyl alcohol, vitamin E, n-octadecyl-β-(4'-hydroxy-3',5'-di-tert-butylphenol) propionate, 2-tert-butyl-6-(3'-tert-butyl-5'-methyl-2'-hydroxybenzyl)-4-methylphenyl acrylate,
2,6-di-tert-butyl-4-(N,N-dimethylaminomethyl)phenol,
3,5-di-tert-butyl-4-hydroxybenzyl phosphonate diethyl ester, 2,2'-methylenebis(4-methyl-6-tert-butylphenol),
2,2'-methylenebis(4-ethyl-6-tert-butylphenol),
4,4'-methylenebis(2,6-di-tert-butylphenol),
2,2'-methylenebis(4-methyl-6-cyclohexylphenol),
2,2'-dimethylene-bis(6-α-methyl-benzyl-p-cresol),
2,2'-ethylidene-bis(4,6-di-tert-butylphenol),
2,2'-butylidene-bis(4-methyl-6-tert-butylphenol),
4,4'-butylidenebis(3-methyl-6-tert-butylphenol), triethylene glycol-N-bis-3-(3-test-butyl-4-hydroxy-5-methylphenyl) propionate,
1,6-hexanediolbis[3-(3,5-di-tert-butyl-4-hydroxyphenyl) propionate],
bis[2-tert-butyl-4-methyl-6-(3-tert-butyl-5-methyl-2-hydroxybenzyl)phenyl]terephthalate,
3,9-bis{2-[3-(3-tert-butyl-4-hydroxy-5-methylphenyl) propionyloxy]-1,1-dimethylethyl}-2,4,8,10-tetraoxaspiro[5,5]undecane, 4,4'-thiobis(6-tert-butyl-m-cresol),
4,4'-thiobis(3-methyl-6-tert-butylpheno2,2'-thiobis(4-methyl-6-tert-butylphenol),
bis(3,5-di-tert-butyl-4-hydroxybenzyl)sulfide,
4,4'-di-thiobis(2,6-di-tert-butylphenol),
4,4'-tri-thiobis(2,6-di-tert-butylphenol),
2,2-thiodiethylenebis-[3-(3,5-di-tert-butyl-4-hydroxyphenyl)propionate],
2,4-bis(n-octylthio)-6-(4-hydroxy-3',5'-di-tert-butylanilino)-1,3,5-triazine,
N,N'-hexamethylenebis-(3,5-di-tert-butyl-4-hydroxyhydrocinnamide),
N,N'-bis[3-(3,5-di-tert-butyl-4-hydroxyphenyl)propionyl] hydrazine,
1,1,3-tris(2-methyl-4-hydroxy-5-tert-butylphenyl)butane,
1,3,5-trimethyl-2,4,6-tris(3,5-di-tert-butyl-4-hydroxybenzyl)benzene, tris(3,5-di-tert-butyl-4-hydroxyphenyl)isocyanurate,
tris(3,5-di-tert-butyl-4-hydroxybenzyl)isocyanurate,
1,3,5-tris(4-tert-butyl-3-hydroxy-2,6-dimethylbenzyl) isocyanurate,
1,3,5-tris{2-[3-(3,5-di-tert-butyl-4-hydroxyphenyl) propionyloxy]ethyl}isocyanurat and
tetrakis[methylene-3-(3',5'-di-tert-butyl-4-hydroxyphenyl) propionate]methane. Out of the above compounds,
tetrakis[methylene-3-(3-tert-butyl-4-hydroxy-5-methylphenyl)propionate]methane,
octadecyl-3-(3,5-di-tert-butyl-4-hydroxyphenyl) propionate and
3,9-bis[2-(3-(3-tert-butyl-4-hydroxy-5-methylphenyl) propionyloxy)-1,1-dimethylethyl]-2,4,8,10-tetraoxaspiro [5,5]undecane are preferred.

Octadecyl-3-(3,5-di-tert-butyl-4-hydroxyphenyl) propionate is particularly preferred. All of them are easily acquired. The above hindered phenol compounds maybe used alone or in combination of two or more.

Examples of the phosphite compound include triphenyl phosphite, tris(nonylphenyl)phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, tris(diethylphenyl)phosphite,
tris(di-iso-propylphenyl)phosphite,
tris(di-n-butylphenyl)phosphite,
tris(2,4-di-tert-butylphenyl)phosphite,
tris(2,6-di-tert-butylphenyl)phosphite, distearyl pentaerythritol diphosphite,
bis(2,4-di-tert-butylphenyl)pentaerythritol diphosphite,
bis(2,6-di-tert-butyl-4-methylphenyl)pentaerythritol diphosphite,
bis(2,6-di-tert-butyl-4-ethylphenyl)pentaerythritol diphosphite, bis{2,4-bis(1-methyl-1-phenylethyl) phenyl}pentaerythritol diphosphite, phenyl bisphenol A pentaerythritol diphosphite,
bis(nonylphenyl)pentaerythritol diphosphite and dicyclohexyl pentaerythritol diphosphite. Other phosphite compounds which react with a dihydric phenol and have acyclic structure include
2,2'-methylenebis(4,6-di-tert-butylphenyl)(2,4-di-tert-butylphenyl)phosphite,
2,2'-methylenebis(4,6-di-tert-butylphenyl)(2-tert-butyl-4-methylphenyl)phosphite and
2,2'-methylenebis(4,6-di-tert-butylphenyl)octyl phosphite. Out of these, distearyl pentaerythritol diphosphite,
bis(2,4-di-tert-butylphenyl)pentaerythritol diphosphate,
bis(2,6-di-tert-butyl-4-methylphenyl)pentaerythritol diphosphite and
bis{2,4-bis(1-methyl-1-phenylethyl)phenyl}pentaerythritol diphosphite are preferred.

Further, diphosphite compounds such as 2,4,8,10-tetra-t-butyl-6-[3-(3-methyl-4-hydroxy-5-t-butylphenyl)propoxy] dibenzo[d,f][1,3,2]dioxaphosphepin [(Sumilizer GP), commercially available product of Sumitomo Chemical Co., Ltd.],
2,10-dimethyl-4,8-di-t-butyl-6-[3-(3,5-di-t-butyl-4-hydroxyphenyl)propoxy]-12H-dibenzo[d,g][1,3,2]dioxaphosphocin,
2,4,8,10-tetra-t-butyl-6-[3-(3,5-di-t-butyl-4-hydroxyphenyl)propoxy]dibenzo[d,f][1,3,2]dioxaphosphepin,
2,4,8,10-tetra-t-pentyl-6-[3-(3,5-di-t-butyl-4-hydroxyphenyl)propoxy]-12-methyl-12H-diobenzo[d,g][1,3,2] dioxaphosphocin,
2,10-dimethyl-4,8-di-t-butyl-6-[3-(3,5-di-t-butyl-4-hydroxyphenyl)propionyloxy]-12H-dibenzo[d,g][1,3,2]dioxaphosphocin,
2,4,8,10-tetra-t-pentyl-6-[3-(3,5-di-t-butyl-4-hydroxyphenyl)propionyloxy]-12-methyl-12H-dibenzo[d,g][1,3,2] oxaphosphocin,
2,4,8,10-tetra-t-butyl-6-[3-(3,5-di-t-butyl-4-hydroxyphenyl)propionyloxy]-dibenzo[d,g][1,3,2]dioxaphosphepin,
2,10-dimethyl-4,8-di-t-butyl-6-(3,5-di-t-butyl-4-hydroxybenzoyloxy)-12H-dibenzo[d,g][1,3,2]dioxaphosphocin,
2,4,8,10-tetra-t-butyl-6-(3,5-di-t-butyl-4-hydroxybenzoyloxy)-12-methyl-12H-dibenzo[d,g][1,3,2]dioxaphosphocin,
2,10-dimethyl-4,8-di-t-butyl-6-[3-(3-methyl-4-hydroxy-5-t-butylphenyl)propoxy]-12H-dibenzo[d,g][1,3,2]dioxaphophocin,
2,4,8,10-tetra-t-butyl-6-[3-(3,5-di-t-butyl-4-hydroxyphenyl)propoxy]-12H-dibenzo[d,g][1,3,2]dioxaphosphocin,
2,10-diethyl-4,8-di-t-butyl-6-[3-(3,5-di-t-butyl-4-hydroxyphenyl)propoxy]-12H-dibenzo[d,g][1,3,2]dioxaphosphocin and
2,4,8,10-tetra-t-butyl-6-[2,2-dimethyl-3-(3-t-butyl-4-hydroxy-5-methylphenyl)propoxy]-dibenzo[d,g][1,3,2]dioxaphosphepin may be used. All of them are easily acquired. The above phosphite compounds may be used alone or in combination of two or more.

Examples of the phosphonite compound include tetrakis (2,4-di-tent-butylphenyl)-4,4'-biphenylene diphosphonite,
tetrakis(2,4-di-tert-butylphenyl)-4,3'-biphenylene diphosphonite,
tetrakis(2,4-di-tert-butylphenyl)-3,3'-biphenylene diphosphonite,
tetrakis(2,6-di-tert-butylphenyl)-4,4'-biphenylene diphosphonite,
tetrakis(2,6-di-tert-butylphenyl)-4,3'-biphenylene diphosphonite,
tetrakis(2,6-di-tert-butylphenyl)-3,3'-biphenylene diphosphonite,
bis(2,4-di-tert-butylphenyl)-4-phenyl-phenyl phosphonite,
bis(2,4-di-tert-butylphenyl)-3-phenyl-phenyl phosphonite,
bis(2,6-di-n-butylphenyl)-3-phenyl-phenyl phosphonite,
bis(2,6-di-tert-butylphenyl)-4-phenyl-phenyl phosphonite and bis(2,6-di-tert-butylphenyl)-3-phenyl-phenyl phosphonite. Out of these,
tetrakis(di-tert-butylphenyl)-biphenylene diphosphonites and bis(di-tert-butylphenyl) -phenyl-phenyl phosphonites are preferred, and
tetrakis(2,4-di-tert-butylphenyl)-biphenylene diphosphonites and
bis(2,4-di-tert-butylphenyl)-phenyl-phenyl phosphonites are more preferred. The phosphonite compound may be and is preferably used in combination with the above phosphite compound having an aryl group substituted for two or more alkyl groups.

Tetrakis(2,4-di-tert-butylphenyl)-biphenylene diphosphonites are preferred as the phosphonite compound. Antioxidants comprising this phosphonite as the main component are marketed under the trade names of Sandostab P-EPQ (trademark, manufactured by Clariant) and Irgafos P-EPQ (trademark, manufactured by CIBA SPECIALTY CHEMICALS). The above phosphonite compounds may be used alone or in combination of two or more.

Examples of the thioether compound include dilauryl thiodipropionate, ditridecyl thiodipropionate, dimyristyl thiodipropionate, distearyl thiodipropionate, pentaerythritol-tetrakis(3-lauryl thiopropionate), pentaerythritol-tetrakis(3-dodecyl thiopropionate), pentaerythritol-tetrakis(3-octadecyl thiopropionate), pentaerythritol-tetrakis(3-myristyl thiopropionate) and pentaerythritol-tetrakis(3-stearyl thiopropionate). The above thioether compounds maybe used alone or in combination of two or more.

As the antioxidant, a combination of two or more of the above hindered phenol compounds, phosphite compounds, phosphonite compounds and thioether compounds is preferably used. By using a combination of two or more of the above hindered phenol compounds, phosphite compounds, phosphonite compounds and thioether compounds, the multiplier effect of the antioxidant is obtained, which is effective in improving low-temperature impact resistance.

The content of the component D is 0.01 to 3 parts by weight, preferably 0.03 to 2 parts by weight, more preferably 0.05 to 1 part by weight based on 100 parts by weight of the component A. When the content of the component D is lower than 0.01 part by weight, an antioxidant effect becomes unsatisfactory and low-temperature impact resistance degrades. When the content is higher than 3 parts by weight, color becomes worse due to a reaction component derived from the antioxidant.

<Other Components>
<Release Agent>

The resin composition of the present invention may comprise a release agent. Examples of the release agent include fatty acids, fatty acid metal salts, oxyfatty acids, paraffins, polyolefins having a low molecular weight, fatty acid amides, alkylene bisfatty acid amides, aliphatic ketones, fatty acid partially saponified esters, fatty acid lower alcohol esters, fatty acid polyhydric alcohol esters, fatty acid polyglycol esters and modified silicones. By blending the release agent, a molded article having excellent mechanical properties, moldability and heat resistance can be obtained.

As the fatty acids, fatty acids having 6 to 30 carbon atoms are preferred, as exemplified by oleic acid, stearic acid, lauric acid, hydroxystearic acid, behenic acid, arachidonic acid, linoleic acid, linolenic acid, ricinoleic acid, palmitic acid, montanic acid and mixtures thereof. As the fatty acid metal salts, alkali (earth) metal salts of a fatty acid having 6 to 40 carbon atoms are preferred, as exemplified by calcium stearate, sodium montanate and calcium montanate.

The oxyfatty acids include, for example, 1,2-oxystearic acid. As the paraffins, paraffins having 18 or more carbon atoms are preferred, as exemplified by liquid paraffin, natural paraffin, microcrystalline wax and petrolatum.

As the polyolefins having a low molecular weight, polyolefins having a molecular weight of not more than 5,000 are preferred, as exemplified by polyethylene wax, maleic acid modified polyethylene wax, oxidized type polyethylene wax, chlorinated polyethylene wax and polypropylene wax.

As the fatty acid amides, fatty acid amides having 6 or more carbon atoms are preferred, as exemplified by oleic acid amide, erucic acid amide and behenic acid amide.

As the alkylene bisfatty acid amides, alkylene bisfatty acid amides having 6 or more carbon atoms are preferred, as exemplified by methylene bisstearamide, ethylene bisstearamide and N,N-bis(2-hydroxyethyl)stearamide.

As the aliphatic ketones, aliphatic ketones having 6 or more carbon atoms are preferred, as exemplified by higher aliphatic ketones.

The fatty acid partially saponified esters include, for example, montanic acid partially saponified ester. The fatty acid lower alcohol esters include, for example, stearic acid ester, oleic acid ester, linoleic acid ester, linolenic acid ester, adipic acid ester, behenic acid ester, arachidonic acid ester, montanic acid ester and isostearic acid ester.

The fatty acid polyhydric alcohols include, for example, glycerol tristearate, glycerol distearate, glycerol monostearate, pentaerythritol tetrastearate, pentaerythritol tristearate, pentaerythritol dimyristearate, pentaerythritol monostearate, pentaerythritol adipate stearate and sorbitan monobehenate.

The fatty acid polyglycol esters include, for example, polyethylene glycol fatty acid ester, polytrimethylol glycol fatty acid ester and polypropylene glycol fatty acid ester.

The modified silicones include, for example, polyether modified silicone, higher fatty acid alkoxy modified silicone, higher fatty acid-containing silicone, higher fatty acid ester modified silicone, methacryl modified silicone and fluorine modified silicone.

Out of these, fatty acids, fatty acid metal salts, oxyfatty acids, fatty acid esters, fatty acid partially saponified esters, paraffins, low-molecular weight polyolefins, fatty acid amides and alkylene bisfatty acid amides are preferred, and fatty acid partially saponified esters and alkylene bisfatty acid amides are more preferred. Montanic acid ester, montanic acid partially saponified ester, polyethylene wax, oxidized polyethylene wax, sorbitan fatty acid ester, erucic acid amide and ethylene bisstearamide are particularly preferred, and montanic acid partially saponified ester and ethylene bisstearamide are most preferred. The release agents may be used alone or in combination of two or more. The content of the release agent is preferably 0.01 to 3 parts by weight, more preferably 0.03 to 2 parts by weight based on 100 parts by weight of the component A.

<Heating Aid>

The resin composition of the present invention may comprise a heating aid to improve heating efficiency with an infrared (IR) heater at the time of blow molding and shorten the heating time. Examples of the heating aid include metal compounds having excellent near infrared absorptivity such as phthalocyanine near infrared absorbent, metal oxide near infrared absorbents including ATO, ITO, iridium oxide, ruthenium oxide and immonium oxide, and metal boride and tungsten oxide near infrared absorbents including lanthanum boride, cerium boride and tungsten boride. As the phthalocyanine near infrared absorbent, for example, the MIR-362 of Mitsui Chemicals, Inc. is commercially available and can be easily acquired. They may be used alone or in combination of two or more. The content of the phthalocyanine near infrared absorbent is preferably 0.0005 to 0.2 part by weight, more preferably 0.0008 to 0.1 part by weight, much more preferably 0.001 to 0.07 part by weight based on 100 parts by weight of the component A. When the above content is lower than 0.0005 part by weight, the effect of the heating aid is not fully obtained, whereby it takes a lot of time to heat the preform at the time of blow molding. When the content is higher than 0.2 part by weight, the heating aid may bleed out at the time of overheating during blow molding. The contents of the metal oxide near infrared absorbent, metal boride near infrared absorbent and tungsten oxide infrared absorbent in the resin are each preferably 0.1 to 500 ppm (based on weight), more preferably 0.5 to 300 ppm. When the above content is lower than 0.1 ppm, the effect of the heating aid is not fully obtained, whereby it takes a lot of time to heat the preform at the time of blow molding. When the content is higher than 500 ppm, the resin component may greatly decompose. When a carbon filler is contained, the preform is hardly heated to the inside thereof uniformly. Therefore, it is recommended that the carbon filler should not be contained.

<Another Resin>

The resin composition of the present invention may comprise another resin different from the component A as long as it does not run counter to the purpose of the present invention. Examples of the resin include thermosetting resins such as phenol resin, melamine resin, silicone resin and epoxy resin, and thermoplastic resins such as polycarbonate resin, polyimide resin, polyether imide resin, polyphenylene ether resin, polysulfone resin, polystyrene resin, acrylonitrile/styrene copolymer (AS resin), polystyrene resin, high-impact polystyrene resin and syndiotactic polystyrene resin. The content of the above resin is preferably 1 to 80 parts by weight, more preferably 3 to 50 parts by weight based on 100 parts by weight of the component A.
<Preparation of Resin Composition>The resin composition of the present invention is produced by mixing together the components A, B, C and D and other additive components.

The other additive components include ultraviolet absorbent, optical stabilizer, fluidity modifier, colorant, light diffuser, fluorescent brightener, light storage pigment, fluorescent dye, antistatic agent, antibacterial agent, crystal nucleating agent, plasticizer and other optional additives.

To produce the resin composition of the present invention, various methods are employed. For example, there is a preferred method in which the component A and the other components are premixed together and then melt kneaded together to be pelletized. Examples of the premixing means include Nauter mixer, twin-cylinder mixer, Henschel mixer, mechanochemical device and extrusion mixer. In premixing, granulation may be carried out with an extrusion granulator or briquetting machine. After premixing, the above components are melt kneaded by means of a melt kneader typified by a vented double-screw extruder and pelletized by means of a pelletizer. Other examples of the melt kneader include Banbury mixer, kneading roll and constant-heating stirring vessel. A vented double-screw extruder is preferred. There is also a method in which the components are independently supplied into a melt kneader typified by a double-screw extruder without being premixing together.
<Production of a Molded Article>

The resin composition of the present invention is generally obtained as a pellet produced by the above method. The pellet is suitable for use as a raw material for the production of a container product by rotational molding or blow molding. Examples of the blow molding technique include direct blow molding, extrusion direct blow molding, one-stage stretch-blow molding and two-stage stretch-blow molding. Out of these, two-stage stretch-blow molding is preferred as a container product having excellent strength, chemical resistance, gas barrier property and heat resistance is obtained.

As preform molding means in the case of two-stage stretch-blow molding, molding techniques such as injection molding, press molding and extrusion molding may be used. Out of these, injection molding and press molding are preferred from the viewpoint of quenching the preform without crystallizing it. For injection molding, not only ordinary cold-runner molding but also hot-runner molding may be used. For injection molding, not only ordinary molding techniques but also injection compression molding, injection press molding, foam molding (including a technique for injecting a supercritical fluid), insert molding, in-mold coating molding, and quick heating and cooling molding may be used according to intended use to obtain a molded article.

When two-stage stretch-blow molding is carried out, preheating can be carried out before blow molding. The preheating temperature is preferably (glass transition temperature of resin as component A−40° C.) to (glass transition temperature of resin as component A+40° C.), more preferably (glass transition temperature of resin as component A−30° C.) to (glass transition temperature of resin as component A+30° C.), most preferably (glass transition temperature of resin as component A−20° C.) to (glass transition temperature of resin as component A+20° C.) . When the preheating temperature is lower than (glass transition temperature of resin as component A−40° C.) , regular heating in the post-processing step takes time and when the heating temperature is higher than (glass transition temperature of resin as component A+40° C.) , the component A is crystallized, whereby the container may be broken during blow molding. As the preheating means, any means such as a preform storage tube or infrared heater in a hot air drier may be used. As for (regular) heating during blow molding, when the preform is thick, it is preferred that the preform should be heated from both inside (internal heating) and outside (external heating). The heating system is preferably an infrared heating system which has high heating efficiency.

Further, a molded article molded from the resin composition of the present invention is preferably heated at (glass transition temperature of resin as component A−40° C.) to (glass transition temperature of resin as component A+40° C.) regardless of the molding technique. By heating the molded article, the effect of improving low-temperature impact resistance is obtained. Although mechanism that low-temperature impact resistance is improved by heating the molded article is unknown, it is assumed that the effect of the component C as a compatibilizing agent is enhanced by the promotion of a reaction between the epoxy group of the component C and the carboxyl group of the component A. The heating temperature of the molded article is more preferably (glass transition temperature of resin as component A−30° C.) to (glass transition temperature of resin as component A+30° C.), most preferably (glass transition temperature of resin as component A−20° C.) to (glass transition temperature of resin as component A+20° C.) . When the heating temperature is lower than (glass transition temperature of resin as component A−40° C.), the effect of improving low-temperature impact resistance may not be obtained and when the heating temperature is higher than (glass transition temperature of resin as component A+40° C.), the molded body may deform. As means for heating the molded article, for example, the molded body is stored in a hot air drier or vacuum heat drier or heated with an infrared heater. The heating time which differs according to the size and thickness of the molded article may be, for example, 30 minutes to 5 hours.

The molded body formed from the resin composition of the present invention can be provided with another function by carrying out surface modification. The surface modification is to form a new layer on the surface layer of a resin molded article by vapor deposition (physical vapor deposition, chemical vapor deposition), plating (electroplating, electroless plating, hot-dip plating), painting, coating or printing. Surface modification means which is used for ordinary resin molded articles may be used.

EXAMPLES

The following examples are provided for the purpose of further illustrating the present invention but are in no way to be taken as limiting.
1. Production of Polymer Polyethylene naphthalate was produced by a method shown in the following Production Examples. Intrinsic viscosity values in the Production Examples were obtained by the following method.

(1). Intrinsic Viscosity (IV) Measuring Method

After 0.6 g of the resin was heated to be molten in 50 ml of a mixed solvent of phenol and tetrachloroethane (weight ratio of 3/2) and cooled to room temperature, the viscosity of the obtained resin solution was measured at 35° C. with an Ostwald viscosity tube so as to obtain the intrinsic viscosity (IV) of the resin from the obtained solution viscosity data.

(2). Production of Resin

Production Examples 1 to 3: Polyethylene Naphthalate (PEN-2, PEN-3, PEN-4)

Dimethyl 2,6-naphthalene dicarboxylate, dimethyl terephthalate and ethylene glycol whose ratio has been adjusted to obtain the composition of a polymer shown in Table 1, and 30 mmol % of cobalt acetate tetrahydrate and 70 mmol % of manganese acetate tetrahydrate based on the total number of moles of dimethyl 2,6-naphthalene dicarboxylate as transesterification catalysts were supplied into a reactor to carry out a transestserification reaction at 240° C. in a nitrogen atmosphere. Subsequently, after 80 mmol % of antimony trioxide based on the total number of moles of dimethyl 2,6-naphthalene dicarboxylate was added, 60 mmol % of orthophosphoric acid based on the total number of moles of dimethyl 2,6-naphthalene dicarboxylate was added, and the resulting mixture was kept at 260° C. for 30 minutes. Thereafter, the temperature was raised and the pressure was reduced gradually, and polycondensation was carried out in the end at 300° C. and 0.1 kPa or less. The proceeding of the polycondensation reaction was checked by the load of a stirring blade, and the reaction was terminated when the desired degree of polymerization was obtained. Thereafter, the reaction product in the system was extruded into a strand from a discharge port continuously, cooled and cut to obtain a granular pellet having a diameter of about 3 mm. The composition and physical properties of the obtained pellet are shown in Table 1.

TABLE 1

|  |  | Production Example 1 PEN-2 | Production Example 2 PEN-3 | Production Example 3 PEN-4 |
|---|---|---|---|---|
| Naphthalene dicarboxylic acid component | mol % in dicarboxylic acid component | 93 | 85 | 80 |
| Terephthalic acid component | mol % in dicarboxylic acid component | 7 | 15 | 20 |
| Ethylene glycol component | mol % in diol component | 100 | 100 | 100 |
| Intrinsic viscosity (IV) | dl/g | 0.65 | 0.65 | 0.66 |

2. Production and Evaluation of Resin Composition Pellet

The production and blow molding of the resin composition pellet were carried out by methods shown in the following Examples and Comparative Examples. Values in the examples were obtained by the following methods.

(1). Evaluation of Blow Molded Body (i) Axial Deviation

When the bottom part of the blow molded body is visually checked, ○ means that a mark produced by projecting a stretch bar does not deviate from the center of a container and X means that the mark deviates from the center.

(ii) Breakage

When the appearance of the blow molded body is visually checked, ○ means that the container is not broken and X means that the container is broken.

(iii) Thickness of Barrel Part

After the barrel part of the blow molded body is cut to a size of 70 mm×70 mm, the thickness of the barrel part is measured at 10 points selected at random to calculate the average value. The thickness needs to be 200 to 540 μm.

(iv) Pearl-like Appearance

When the appearance of the blow molded body is visually checked, ○ means that a pearl-like appearance is not produced by the delamination of the container and X means that a pearl-like appearance is seen due to delamination.

(v) Surface Roughness in Appearance

When the appearance of the blow molded body is visually checked, ○ means that the surface of the container is not rough and X means that the surface is rough.

(vi) Color

When the appearance of the blow molded body is visually checked, ○ means that the color of the container is transparent or light yellow and X means that the container is tinged with strong yellow.

(2) Evaluation of Physical Properties (i) 23° C. Notched Charpy Impact Strength

Each of the pellets obtained by the method described in the following Examples was dried at 100° C. for 5 hours with a hot air circulation drier and molded at a cylinder temperature of 290° C., a mold temperature of 80° C. and a molding cycle of 50 seconds by using an injection molding machine (IS-150EN of Toshiba Machine Co., Ltd.) to obtain an ISO standard-based test specimen having a thickness of 4 mm. After the obtained test specimen was left at a temperature of 23° C. and a relative humidity of 50% for 24 hours, its notched Charpy impact strength was measured based on ISO standards.

(ii) −60° C. Notched Charpy Impact Strength

The pellet obtained by the method described in the following Examples was dried at 100° C. for 5 hours with a hot air circulation drier and molded at a cylinder temperature of 290° C., a mold temperature of 80° C. and a molding cycle of 50 seconds by using an injection molding machine (IS-150EN of Toshiba Machine Co., Ltd.) to obtain an ISO standard-based test specimen having a thickness of 4 mm. After the obtained test specimen was left in a thermostatic tank at a temperature of −60° C. for 6 hours, it was taken out quickly from the thermostatic tank to measure its notched Charpy impact strength based on ISO standards.

(iii) 23° C. Notched Charpy Impact Strength (After Heating)

The pellet obtained by the method described in the following Examples was dried at 100° C. for 5 hours with a hot air circulation drier and molded at a cylinder temperature of 290° C., a mold temperature of 80° C. and a molding cycle of 50 seconds by using an injection molding machine (IS-150EN of Toshiba Machine Co., Ltd.) to obtain an ISO standard-based test specimen having a thickness of 4 mm. After the obtained test specimen was heated at a temperature of 100° C. for 12 hours with a hot air drier and then left at a temperature of 23° C. and a relative humidity of 50% for 24 hours, its notched Charpy impact strength was measured based on ISO standards.

(iv) −60° C. Notched Charpy Impact Strength (After Heating)

The pellet obtained by the method described in the following Examples was dried at 100° C. for 5 hours with a hot air circulation drier and molded at a cylinder temperature of 290° C., a mold temperature of 80° C. and a molding cycle of 50 seconds by using an injection molding machine (IS-150EN of Toshiba Machine Co., Ltd.) to obtain an ISO standard-based test specimen having a thickness of 4 mm. After the obtained test specimen was heated at 100° C. for 12 hours with a hot air drier and then left in a thermostatic tank at a temperature of −60° C. for 6 hours, it was taken out quickly from the thermostatic tank to measure its notched Charpy impact strength based on ISO standards.

The following raw materials were used as components except for PEN-2, PEN-3 and PEN-4.

<Component A>
PEN-1: Teonex TR-8065S of Teijin Limited [polyethylene naphthalate produced from 100 mol % of naphthalene dicarboxylic acid and 100 mol % of ethylene glycol, intrinsic viscosity of 0.67 dl/g]
PET-1: TRN-8550FF of Teijin Limited [polyethylene terephthalate produced from 100 mol % of terephthalic acid and 100 mol % of ethylene glycol, intrinsic viscosity of 0.77 dl/g]

<Component B>
B-1: Tafmer DF605 of Mitsui Chemicals, Inc. [ethylene-propylene-5-ethylidene-2-norbornene copolymer]
B-2: Tafmer MH5020 of Mitsui Chemicals, Inc. [ethylene-propylene-5-ethylidene-2-norbornene copolymer modified by 1 mol % of maleic acid]
B-3: Tafmer MH5040 of Mitsui Chemicals, Inc. [ethylene-propylene-5-ethylidene-2-norbornene copolymer modified by 2 mol % of maleic acid]

<Component B'>
B'-1: Metablen S-2001 of Mitsubishi Rayon Co., Ltd. [silicon-based core shell type rubber]
B'-2: G-1651ES of Krayton Corporation [styrene-butadiene-styrene-ethylene copolymer]

<Component C>
C-1: EP2601 of Down Corning Toray Co., Ltd. [epoxy group-containing silicon elastomer]

<Component C'>
C'-1 : EP5500 of Dow Corning Toray Co. , Ltd. [silicon elastomer containing no epoxy group]
C'-2: BONDFAST 7M of Sumitomo Chemical Co., Ltd. [epoxy group-containing ethylene methyl methacrylate copolymer]

<Component D>
D-1: Irganox1076 of BASF Japan [n-octadecyl-3-(3',5'-di-tert-butyl-4'-hydroxyphenyl) propionate]
D-2: SONGNOX6260PW of SONGWON International Japan K.K. [bis(2,4-di-tert-butylphenyl)pentaerythritol diphosphite]
D-3: Sandstab (??) P-EPQ of Clariant Japan K.K. [tetrakis (2,4-di-tert-butylphenyl) [1,1-biphenyl]-4,4'-diylbisphosphonite]
D-4: ADK STAB AO-412S of ADEKA Corporation [3-lauryl thiopropionate]

Examples 1 to 12, Comparative Examples 1 to 12

(Preparation of Composition)
After PEN-1 was used as the component A to be uniformly premixed with components shown in Tables 2 and 3 by dry blending, the resulting premixtures were each supplied into a melt extruder from a first feed port and melt extruded to be pelletized. The first feed port is a feed port at the base. Melt extrusion was carried out by using a vented double-screw extruder having a diameter of 30 mm and a side screw [TEX30α-38.5BW-3V of The Japan Steel Works, Ltd.]. The extrusion temperature was C1/C2/C3 to D=80° C./200° C./300° C., the revolution of the main screw was 150 rpm, the revolution of the side screw was 50 rpm, the delivery rate was 20 kg/h, and the vent vacuum degree was 3 kPa.

Figure 2:
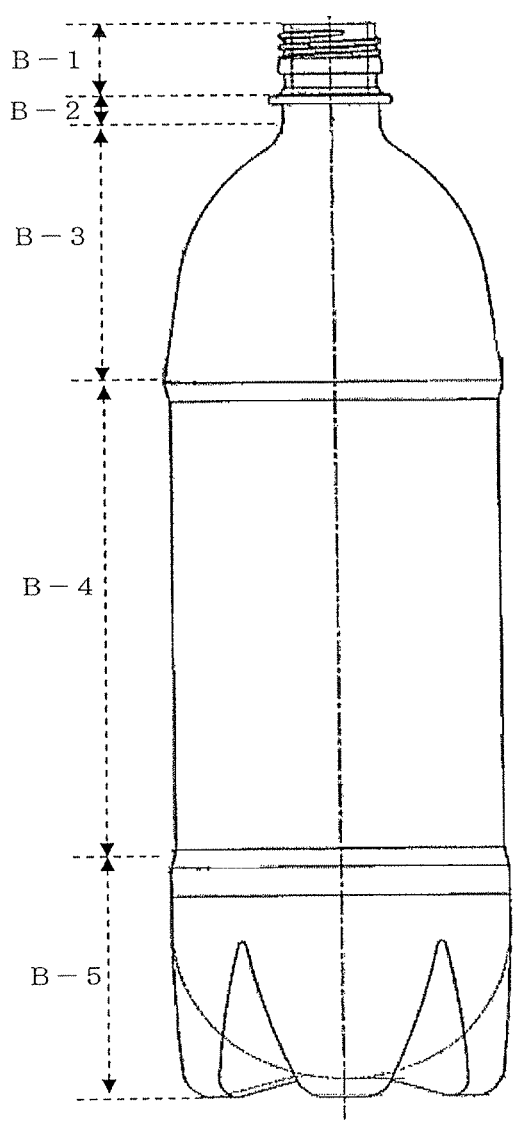
FIG. 2 is a side view of a blow molded body produced in Example 1 of the present invention.

(Blow Molding)
After each of the obtained pellets was dried at 160° C. for 5 hours with a hot air drier, it was molded into a preform. The EC160NII-4Y of Toshiba Machine Co., Ltd. was used as a molding machine to carry out molding at a cylinder temperature of 290° C., a mold temperature of 20° C. and a cooling time of 20 seconds so as to obtain a preform having a thickness of 4.2 mm. FIG. 1 is a side view of the obtained preform. In FIG. 1, A-1 is the mouth of the preform, A-2 is the neck of the preform, A-3 is the shoulder of the preform, A-4 is the barrel of the preform, and A-5 is the bottom of the preform. The biaxially stretch-blow molding of the above preform was carried out by using the FDB-1D of Frontier Co., Ltd. as a blow machine and a 1.5 L container-like blow mold (2.3 times in length×3.4 times in width) in accordance with the following procedure. The preform which had been preheated at 100° C. for 1 hour in a hot air drier was set in the blow molding machine and heated by setting the output of an IR heater to ensure that the surface temperature of the preform became 150° C. Subsequently, blow molding was carried out under conditions such as a rod drawing speed of 60%, a primary blow delay time of 0.2 second, a primary blow time of 0.3 second, a primary blow pressure of 1.2 MPa, a secondary blow time of 1.2 seconds, a second blow pressure of 3.4 MPa and a mold temperature of 20° C. FIG. 2 is a side view of the obtained blow molded body. In FIG. 2, B-1 is the mouth of the blow molded body, B-2 is the neck of the blow molded body, B-3 is the shoulder of the blow molded body, B-4 is the barrel of the blow molded body, and B-5 is the bottom of the blow molded body. Evaluations in 2 (1) (i) to (vi) were made on the obtained blow molded body. The results are shown in Table 2 and Table 3. Table 2 and Table 3 also show the evaluation results of the physical properties in 2 (2) (i) to (iv) of the obtained pellets.

Example 13

A pellet was obtained and the physical properties in 2 (2) (i) to (iv) of the pellet were evaluated in the same manner as in Example 1 except that PEN-2 produced in Production Example 1 was used as the component A. Further, blow molding was carried out by using the obtained pellet in the same manner as in Example 1 to make evaluations in 2(1) (i) to (vi) on the obtained blow molded body. The results are shown in Table 2.

Example 14

A pellet was obtained and the physical properties in 2 (2) (i) to (iv) of the pellet were evaluated in the same manner as in Example 1 except that PEN-3 produced in Production Example 2 was used as the component A. Further, blow molding was carried out by using the obtained pellet in the same manner as in Example 1 to make evaluations in 2(1) (i) to (vi) on the obtained blow molded body. The results are shown in Table 2.

Example 15

A pellet was obtained and the physical properties in 2 (2) (i) to (iv) of the pellet were evaluated in the same manner as in Example 1 except that PEN-4 produced in Production Example 3 was used as the component A. Further, blow molding was carried out by using the obtained pellet in the same manner as in Example 1 to make evaluations in 2(1) (i) to (vi) on the obtained blow molded body. The results are shown in Table 2.

Example 16

A pellet was obtained and the physical properties in 2(2) (i) to (iv) of the pellet were evaluated in the same manner as in Example 1 except that PET-1 was used as the component A. Further, blow molding was carried out by the following method. After the obtained pellet was dried at 160° C. for 5 hours with a hot air drier, it was molded into a preform. Molding was carried out at a cylinder temperature of 290° C., a mold temperature of 20° C. and a cooling time of 20 seconds by using the EC160NII-4Y of Toshima Machine Co., Ltd. as a molding machine to obtain a preform having a thickness of 4.2 mm. Then, the biaxial stretch-blow molding of the above preform was carried out by using the FDB-1D of Frontier Co., Ltd. as a blow machine and a 1.5 L container-like blow mold (2.3 times in length×3.4 times in width) according to the following procedure. After the preform was preheated at 60° C. for 1 hour in a hot air drier, it was set in a blow molding machine and heated by setting the output of an IR heater to ensure that the surface temperature of the preform became 100° C. Subsequently, blow molding was carried out under conditions such as a rod drawing speed of 60%, a primary blow delay time of 0.2 second, a primary blow time of 0.3 second, a primary blow pressure of 1.2 MPa, a secondary blow time of 1.2 seconds, a second blow pressure of 3.4 MPa and a mold temperature of 20° C. The above evaluations 2(1)(i) to (vi) were made on the obtained blow molded body. The results are shown in Table 2.

TABLE 2

| | | | Example | | | | | | | | |
|---|---|---|---|---|---|---|---|---|---|---|---|
| | | unit | 1 | 2 | 3 | 4 | 5 | 6 | 7 | 8 |
| Component A | PEN-1 | pbw | 100 | 100 | 100 | 100 | 100 | 100 | 100 | 100 |
| | PEN-2 | | | | | | | | | |
| | PEN-3 | | | | | | | | | |
| | PEN-4 | | | | | | | | | |
| | PET-1 | | | | | | | | | |
| Component B | B-1 | | 5 | 30 | 65 | 80 | 30 | | | 30 |
| | B-2 | | | | | | | 30 | | |
| | B-3 | | | | | | | | 30 | |
| Component B' | B'-1 | | | | | | | | | |
| | B'-2 | | | | | | | | | |
| Component C | C-1 | | 1 | 10 | 10 | 10 | 30 | 10 | 10 | 10 |
| Component C' | C'-1 | | | | | | | | | |
| | C'-2 | | | | | | | | | |
| Component D | D-1 | | 0.1 | 0.1 | 0.1 | 0.1 | 0.1 | 0.1 | 0.1 | 0.1 |
| | D-2 | | 0.1 | 0.1 | 0.1 | 0.1 | 0.1 | 0.1 | 0.1 | |
| | D-3 | | | | | | | | | |
| | D-4 | | | | | | | | | |
| Evaluation of blow molding | Axial deviation | — | ○ | ○ | ○ | ○ | ○ | ○ | ○ | ○ |
| | Breakage | — | ○ | ○ | ○ | ○ | ○ | ○ | ○ | ○ |
| | Thickness of barrel | μm | 290 | 287 | 271 | 265 | 280 | 301 | 305 | 288 |
| | Pearl-like appearance | — | ○ | ○ | ○ | ○ | ○ | ○ | ○ | ○ |
| | surface roughness in appearance | — | ○ | ○ | ○ | ○ | ○ | ○ | ○ | ○ |
| | Color | — | ○ | ○ | ○ | ○ | ○ | ○ | ○ | ○ |
| Evaluation of physical properties | 23° C. notched Charpy impact strength | kJ/m² | 8 | 22 | 73 | 80 | 45 | 32 | 33 | 19 |
| | −60° C. notched Charpy impact strength | kJ/m² | 5 | 8 | 16 | 18 | 10 | 10 | 10 | 7 |
| Evaluation of physical properties after heating | 23° C. notched Charpy impact strength | kJ/m² | 10 | 27 | 78 | 80 | 61 | 38 | 41 | 22 |
| | −60° C. notched Charpy impact strength | kJ/m² | 7 | 10 | 19 | 25 | 13 | 13 | 13 | 9 |

| | | | Example | | | | | | | | |
|---|---|---|---|---|---|---|---|---|---|---|---|
| | | unit | 9 | 10 | 11 | 12 | 13 | 14 | 15 | 16 |
| Component A | PEN-1 | pbw | 100 | 100 | 100 | 100 | | | | |
| | PEN-2 | | | | | | 100 | | | |
| | PEN-3 | | | | | | | 100 | | |
| | PEN-4 | | | | | | | | 100 | |
| | PET-1 | | | | | | | | | 100 |
| Component B | B-1 | | 30 | 30 | 30 | 30 | 30 | 30 | 30 | 30 |
| | B-2 | | | | | | | | | |
| | B-3 | | | | | | | | | |
| Component B' | B'-1 | | | | | | | | | |
| | B'-2 | | | | | | | | | |
| Component C | C-1 | | 10 | 10 | 10 | 10 | 10 | 10 | 10 | 10 |
| Component C' | C'-1 | | | | | | | | | |
| | C'-2 | | | | | | | | | |
| Component D | D-1 | | | | | | 2 | 0.1 | 0.1 | 0.1 |
| | D-2 | | 0.1 | | | | 0.5 | 0.1 | 0.1 | 0.1 |
| | D-3 | | | 0.1 | | | | | | |
| | D-4 | | | | 0.1 | | | | | |

TABLE 2-continued

| | | | | | | | | | | |
|---|---|---|---|---|---|---|---|---|---|---|
| Evaluation of blow molding | Axial deviation | — | ○ | ○ | ○ | ○ | ○ | ○ | ○ | ○ |
| | Breakage | — | ○ | ○ | ○ | ○ | ○ | ○ | ○ | ○ |
| | Thickness of barrel | μm | 283 | 280 | 285 | 277 | 251 | 230 | 219 | 320 |
| | Pearl-like appearance | — | ○ | ○ | ○ | ○ | ○ | ○ | ○ | ○ |
| | surface roughness in appearance | — | ○ | ○ | ○ | ○ | ○ | ○ | ○ | ○ |
| | Color | — | ○ | ○ | ○ | ○ | ○ | ○ | ○ | ○ |
| Evaluation of physical properties | 23° C. notched Charpy impact strength | kJ/m$^2$ | 18 | 19 | 19 | 19 | 20 | 20 | 21 | 22 |
| | −60° C. notched Charpy impact strength | kJ/m$^2$ | 7 | 7 | 7 | 7 | 8 | 8 | 8 | 7 |
| Evaluation of physical properties after heating | 23° C. notched Charpy impact strength | kJ/m$^2$ | 23 | 23 | 21 | 22 | 23 | 26 | 23 | 23 |
| | −60° C. notched Charpy impact strength | kJ/m$^2$ | 9 | 8 | 9 | 9 | 10 | 10 | 10 | 10 | pbw: parts by weight

TABLE 3

| | | | Comparative Example | | | | | |
|---|---|---|---|---|---|---|---|---|
| | | unit | 1 | 2 | 3 | 4 | 5 | 6 |
| Component A | PEN-1 | pbw | 100 | 100 | 100 | 100 | 100 | 100 |
| | PEN-2 | | | | | | | |
| | PEN-3 | | | | | | | |
| | PEN-4 | | | | | | | |
| | PET-1 | | | | | | | |
| Component B | B-1 | | | 30 | 30 | 30 | 30 | |
| | B-2 | | | | | | | |
| | B-3 | | | | | | | |
| Component B' | B'-1 | | | | | | | 30 |
| | B'-2 | | | | | | | |
| Component C | C-1 | | | | 10 | | | 10 |
| Component C' | C'-1 | | | | | 10 | | |
| | C'-2 | | | | | | 10 | |
| Component D | D-1 | | | | | 0.1 | 0.1 | 0.1 |
| | D-2 | | | | | 0.1 | 0.1 | 0.1 |
| | D-3 | | | | | | | |
| | D-4 | | | | | | | |

| | | | Example | | | | | |
|---|---|---|---|---|---|---|---|---|
| | | unit | 1 | 2 | 3 | 4 | 5 | 6 |
| Evaluation of blow molding | Axial deviation | — | ○ | ○ | ○ | ○ | ○ | ○ |
| | Breakage | — | ○ | ○ | ○ | ○ | ○ | ○ |
| | Thickness of barrel | μm | 288 | 263 | 281 | 265 | 284 | 279 |
| | Pearl-like appearance | — | ○ | x | ○ | x | ○ | ○ |
| | surface roughness in appearance | — | ○ | ○ | ○ | ○ | ○ | ○ |
| | Color | — | ○ | ○ | ○ | ○ | ○ | ○ |
| Evaluation of physical properties | 23° C. notched Charpy impact strength | kJ/m$^2$ | 3 | 8 | 10 | 8 | 6 | 23 |
| | −60° C. notched Charpy impact strength | kJ/m$^2$ | 2 | 3 | 3 | 3 | 3 | 3 |
| Evaluation of physical properties after heating | 23° C. notched Charpy impact strength | kJ/m$^2$ | 3 | 8 | 11 | 9 | 7 | 23 |
| | −60° C. notched Charpy impact strength | kJ/m$^2$ | 2 | 2 | 3 | 3 | 3 | 3 |

| | | | Comparative Example | | | | | |
|---|---|---|---|---|---|---|---|---|
| | | unit | 7 | 8 | 9 | 10 | 11 | 12 |
| Component A | PEN-1 | pbw | 100 | 100 | 100 | 100 | 100 | 100 |
| | PEN-2 | | | | | | | |
| | PEN-3 | | | | | | | |
| | PEN-4 | | | | | | | |
| | PET-1 | | | | | | | |
| Component B | B-1 | | | | 3 | 90 | 30 | 30 | 30 |
| | B-2 | | | | | | | |
| | B-3 | | | | | | | |
| Component B' | B'-1 | | | | | | | |
| | B'-2 | | | 30 | | | | |

TABLE 3-continued

| | | | | | | | | |
|---|---|---|---|---|---|---|---|---|
| Component C | C-1 | | 10 | 1 | 10 | 0.5 | 40 | 10 |
| Component C' | C'-1 | | | | | | | |
| | C'-2 | | | | | | | |
| Component D | D-1 | | 0.1 | 0.1 | 0.1 | 0.1 | 0.1 | 4 |
| | D-2 | | 0.1 | 0.1 | 0.1 | 0.1 | 0.1 | 1 |
| | D-3 | | | | | | | |
| | D-4 | | | | | | | |

| | | | Example | | | | | |
|---|---|---|---|---|---|---|---|---|
| | | Unit | 7 | 8 | 9 | 10 | 11 | 12 |
| Evaluation of blow molding | Axial deviation | — | ○ | ○ | ○ | ○ | ○ | ○ |
| | Breakage | — | ○ | ○ | ○ | ○ | ○ | ○ |
| | Thickness of barrel | μm | 277 | 282 | 199 | 276 | 269 | 255 |
| | Pearl-like appearance | — | ○ | ○ | ○ | x | ○ | ○ |
| | surface roughness in appearance | — | ○ | ○ | ○ | ○ | x | ○ |
| | Color | — | ○ | ○ | ○ | ○ | ○ | x |
| Evaluation of physical properties | 23° C. notched Charpy impact strength | kJ/m² | 26 | 4 | 67 | 8 | 44 | 19 |
| | −60° C. notched Charpy impact strength | kJ/m² | 2 | 2 | 19 | 3 | 14 | 8 |
| Evaluation of physical properties after heating | 23° C. notched Charpy impact strength | kJ/m² | 26 | 4 | 73 | 8 | 48 | 20 |
| | −60° C. notched Charpy impact strength | kJ/m² | 3 | 2 | 20 | 3 | 17 | 10 | pbw: parts by weight

The following can be said from the results shown in Table 2 and Table 3.

The stretch-blow molded articles of the resin compositions of Examples 1 to 16 are free from axial deviation and breakage and have a good appearance and excellent 23° C. and −60° C. notched Charpy impact strengths. By heating an ISO test specimen, impact resistance was further improved.

On the other hand, in the case of Comparative Example 1 in which PEN-1 was directly used, the obtained molded article was inferior in 23° C. and −60° C. notched Charpy impact strengths.

In the case of Comparative Example 2 in which only the components A and B were contained, the obtained blow molded article had a pearl-like appearance and was inferior in −60° C. notched Charpy impact strength.

In the case of Comparative Example 3 in which component D was not contained, the obtained blow molded article was inferior in −60° C. notched Charpy impact strength.

Further, in the case of Comparative Example 4 in which the component C was not used and the component C'-1 was used, the obtained blow molded article had a pearl-like appearance and was inferior in −60° C. notched Charpy impact strength.

In the case of Comparative Example 5 in which the component C was not used and the component C'-2 was used, the obtained blow molded article was inferior in −60° C. notched Charpy impact strength.

In the case of Comparative Examples 6 and 7 in which the component B was not used and the component B'-1 or B'-2 was used, the obtained blow molded articles were inferior in −60° C. notched Charpy impact strength.

The blow molded article of Comparative Example 8 was inferior in 23° C. and −60° C. notched Charpy impact strengths as the content of the component B was too low.

A tear was seen in the appearance of the blow molded article of Comparative Example 9 and the barrel part of the obtained container was thin as the content of the component B was too high.

The blow molded article of Comparative Example 10 had a pearl-like appearance and was inferior in −60° C. notched Charpy impact strength as the content of the component C was too low.

The blow molded article of Comparative Example 11 had surface roughness in appearance as the content of the component C was too high.

Finally, the blow molded article of Comparative Example 12 was tinged with strong yellow as the content of the component D was too high.

EFFECT OF THE INVENTION

Since the resin composition of the present invention has excellent low-temperature impact resistance and suppresses the delamination of a stretch-blow molded container, it can be used as a liner for pressure containers such as LPG cylinders, carbonic dioxide cylinders, oxygen cylinders and natural gas cylinders and is very useful industrially.

The invention claimed is:
1. A resin composition comprising:
    (A) 100 parts by weight of a resin having a carboxyl group in at least part of the end of the molecular chain,
    (B) 5 to 80 parts by weight of an ethylene-α-olefin copolymer,
    (C) 1 to 30 parts by weight of an epoxy group-containing crosslinked silicone elastomer, and
    (D) 0.01 to 3 parts by weight of at least one antioxidant selected from the group consisting of hindered phenol compound, phosphite compound, phosphonite compound and thioether compound.
2. The resin composition according to claim 1, wherein the resin is an aromatic polyester.
3. The resin composition according to claim 1, wherein the ethylene-α-olefin copolymer is an ethylene-α-olefin copolymer modified with an unsaturated carboxylic acid or an acid derivative thereof.
4. The resin composition according to claim 1, wherein the resin is an aromatic polyester comprising 80 to 100 mol % of naphthalene dicarboxylic acid and 0 to 20 mol % of at least one selected from the group consisting of terephthalic acid and isophthalic acid as dicarboxylic acid components and ethylene glycol as a diol component.

5. A method of improving the low-temperature impact resistance of a molded article, wherein a molded article of the resin composition of claim 1 is heated at a temperature range from (glass transition temperature of the resin −40° C.) to (glass transition temperature of the resin +40° C.).

6. The resin composition according to claim 2, wherein the ethylene-α-olefin copolymer is an ethylene-α-olefin copolymer modified with an unsaturated carboxylic acid or an acid derivative thereof.

7. The resin composition according to claim 2, wherein the resin is an aromatic polyester comprising 80 to 100 mol % of naphthalene dicarboxylic acid and 0 to 20 mol % of at least one selected from the group consisting of terephthalic acid and isophthalic acid as dicarboxylic acid components and ethylene glycol as a diol component.

8. The resin composition according to claim 3, wherein the resin is an aromatic polyester comprising 80 to 100 mol % of naphthalene dicarboxylic acid and 0 to 20 mol % of at least one selected from the group consisting of terephthalic acid and isophthalic acid as dicarboxylic acid components and ethylene glycol as a diol component.

9. The resin composition according to claim 6, wherein the resin is an aromatic polyester comprising 80 to 100 mol % of naphthalene dicarboxylic acid and 0 to 20 mol % of at least one selected from the group consisting of terephthalic acid and isophthalic acid as dicarboxylic acid components and ethylene glycol as a diol component.

10. A method of improving the low-temperature impact resistance of a molded article, wherein a molded article of the resin composition of claim 2 is heated at a temperature range from (glass transition temperature of the resin −40° C.) to (glass transition temperature of the resin +40° C.).

11. A method of improving the low-temperature impact resistance of a molded article, wherein a molded article of the resin composition of claim 3 is heated at a temperature range from (glass transition temperature of the resin −40° C.) to (glass transition temperature of the resin +40° C.).

12. A method of improving the low-temperature impact resistance of a molded article, wherein a molded article of the resin composition of claim 6 is heated at a temperature range from (glass transition temperature of the resin −40° C.) to (glass transition temperature of the resin +40° C.).

13. A method of improving the low-temperature impact resistance of a molded article, wherein a molded article of the resin composition of claim 4 is heated at a temperature range from (glass transition temperature of the resin −40° C.) to (glass transition temperature of the resin +40° C.).

14. A method of improving the low-temperature impact resistance of a molded article, wherein a molded article of the resin composition of claim 7 is heated at a temperature range from (glass transition temperature of the resin −40° C.) to (glass transition temperature of the resin +40° C.).

15. A method of improving the low-temperature impact resistance of a molded article, wherein a molded article of the resin composition of claim 8 is heated at a temperature range from (glass transition temperature of the resin −40° C.) to (glass transition temperature of the resin +40° C.).

16. A method of improving the low-temperature impact resistance of a molded article, wherein a molded article of the resin composition of claim 9 is heated at a temperature range from (glass transition temperature of the resin −40° C.) to (glass transition temperature of the resin +40° C.).

\* \* \* \* \*